(12) United States Patent
Koopmans et al.

(10) Patent No.: US 7,374,675 B2
(45) Date of Patent: May 20, 2008

(54) MIXER FOR USE IN WASTEWATER TREATMENT PROCESSES

(76) Inventors: Richard J. Koopmans, 15035 SE. 46th St., Bellevue, WA (US) 98006-2568; Kristinn G. Drewry, 15035 SE. 46th St., Bellevue, WA (US) 98006-2568

( * ) Notice: Subject to any disclaimer, the term of this patent is extended or adjusted under 35 U.S.C. 154(b) by 0 days.

(21) Appl. No.: 11/433,262

(22) Filed: May 12, 2006

(65) Prior Publication Data

US 2006/0254980 A1 Nov. 16, 2006

Related U.S. Application Data

(60) Provisional application No. 60/681,615, filed on May 16, 2005.

(51) Int. Cl.
*C02F 3/00* (2006.01)
(52) U.S. Cl. .................................... 210/220
(58) Field of Classification Search ........ 210/620, 210/629, 220
See application file for complete search history.

(56) References Cited

U.S. PATENT DOCUMENTS

| | | | |
|---|---|---|---|
| 4,595,296 A | 6/1986 | Parks | |
| 5,961,830 A * | 10/1999 | Barnett | 210/603 |
| 6,279,882 B1 * | 8/2001 | Littman et al. | 261/76 |
| 6,280,636 B1 | 8/2001 | Locklair | |
| 6,372,140 B2 | 4/2002 | Kelly | |
| 6,629,773 B2 | 10/2003 | Parks | |
| 6,896,804 B2 | 5/2005 | Haerther et al. | |
| 7,005,068 B2 | 2/2006 | Hoffland | |
| 2005/0274669 A1 * | 12/2005 | Marchesseault et al. | 210/605 |
| 2006/0054552 A1 * | 3/2006 | Liu et al. | 210/605 |
| 2006/0054554 A1 * | 3/2006 | Spears et al. | 210/620 |
| 2006/0060525 A1 * | 3/2006 | Hoffland | 210/603 |
| 2006/0070948 A1 * | 4/2006 | Wickham | 210/610 |
| 2006/0081534 A1 * | 4/2006 | Dimitriou et al. | 210/620 |
| 2006/0086662 A1 * | 4/2006 | Ogden | 210/620 |
| 2006/0096918 A1 * | 5/2006 | Semmens | 210/615 |
| 2006/0124543 A1 * | 6/2006 | Pehrson et al. | 210/614 |
| 2006/0201876 A1 * | 9/2006 | Jordan | 210/609 |

* cited by examiner

*Primary Examiner*—Chester T. Barry
(74) *Attorney, Agent, or Firm*—Anthony Claiborne

(57) ABSTRACT

A system and method of aerobic wastewater treatment provides large mixing bubbles along with small oxygenating bubbles supplied by diffusers. The mixing bubbles are large enough to move wastewater and generate a mixing current as they rise to the surface. The mixing current mixes the wastewater, bacteria and other microorganisms, and the small oxygenating bubbles from the diffusers to promote the bacteria and other microorganisms' conversion of the pollutants contained in the wastewater. The mixing provided by the large mixing bubbles enhances the efficiency of wastewater aeration provided by the small oxygenating bubbles.

4 Claims, 6 Drawing Sheets

MIXER FOR USE IN WASTEWATER TREATMENT PROCESSES

CROSS REFERENCE TO RELATED APPLICATION

This application claims priority from U.S. provisional application No. 60/681,615, filed May 16, 2005, entitled MIXER FOR USE IN WASTEWATER TREATMENT PROCESSES.

BACKGROUND

Water is frequently used to transport unwanted materials—waste—to a facility where the waste is removed or neutralized in the water. For example, water carries most sewage and industrial waste, such as chemicals, in the form of wastewater to a treatment facility where the water is treated and then returned to the environment for future use. The wastewater treatment process typically includes three general phases. The first phase, or primary treatment, involves mechanically separating the dense solids in the wastewater from the less dense solids and liquid in the wastewater. This is typically done in sedimentation tanks with the help of gravity. The second phase, or secondary treatment, involves the biological conversion of carbonaceous and nutrient material in the wastewater to more environmentally friendly forms. This is typically done by promoting the consumption of the carbonaceous and nutrient material by bacteria and other types of beneficial organisms already present in the wastewater or mixed into the wastewater. The third phase, or tertiary treatment, involves removing the remaining pollutant material from the wastewater. This is typically done by filtration and/or the addition of chemicals and/or UV light and/or Ozone to neutralize harmful organisms and/or remove pollutant material.

The second phase of the wastewater treatment process typically includes an aerobic—with oxygen—portion in which bacterial and other microorganisms are provided dissolved oxygen to promote their consumption of the carbonaceous and nutrient materials, and an anoxic—oxygen from a nitrate/nitrite source—portion in which the bacteria and other microorganisms use the oxygen in the nitrate/nitrite for their metabolic functions. The second phase may also include an anaerobic—without oxygen— portion in which bacteria and other microorganisms metabolically function without oxygen. The aerobic, anoxic and anaerobic portions are typically carried out in tanks that are divided into aerobic, anoxic and anaerobic zones. The tank may include one zone in which the aerobic portion operates and one in which the anoxic portion operates and one in which the anaerobic portion operates, or the tank may include any combination of any number of these zones. In some applications, a tank may be solely dedicated to one of the three aerobic, anoxic and anaerobic portions.

In the aerobic process, wastewater that includes ammonium ($NH_4$) and organic waste containing nitrogen, for example Urea ($(NH_2)_2CO$), enters the aerobic zone. In the presence of dissolved oxygen ($O_2$), bacteria and other microorganisms convert the ammonium into nitrate ($NO_3$) via nitrite ($NO_2$). The nitrate can then be anoxically processed into nitrogen gas ($N_2$), which is harmless in the environment. A blower and diffusers supply the dissolved oxygen to the wastewater. The blower provides air to the diffusers, and the diffusers generate and release tiny bubbles so that the oxygen in the bubbles will dissolve in the wastewater. As the aerobic process progresses, the amount of ammonium in the wastewater decreases while the amount of nitrate and dissolved oxygen increases. The amount of dissolved oxygen increases because the demand for the dissolved oxygen decreases as the amount of nitrate increases. After most of the ammonium has been converted into nitrate, the wastewater is ready to be anoxically processed.

In the anoxic process, wastewater that includes nitrate and the organic waste containing nitrogen enters the anoxic zone. In the absence of dissolved oxygen, bacteria and other microorganisms convert the nitrate into nitrogen gas and the organic waste containing nitrogen into ammonium. As the anoxic process progresses, the amount of nitrate decreases and the amount of ammonium increases. After most of the nitrate has been converted into nitrogen gas, the wastewater is ready to be aerobically processed or treated in the tertiary treatment phase.

Mixing the contents in each of the aerobic and anoxic zones promotes the conversion reactions in each zone by increasing the contact of the components, such as the dissolved oxygen (aerobic zone), nitrite/nitrate (anoxic zone), wastewater, and bacteria and other microorganisms, with the other components in each zone. In the aerobic zone, the wastewater is typically mixed by the movement of the tiny bubbles through the wastewater and a mechanical mixer that includes a screw or blade that is turned by a motor. In the anoxic zone, a mechanical mixer typically only mixes the wastewater because the anoxic process requires little or no dissolved oxygen, which the tiny bubbles from the diffusers provide.

The typical prior art means for mixing the wastewater in the aerobic and anoxic zones is subject to several limitations. Mixing the aerobic zone with the movement of the tiny bubbles through the wastewater requires a substantial amount of tiny bubbles to be injected into the wastewater to sufficiently mix the wastewater. Disadvantageously, the demand for dissolved oxygen in the wastewater may decrease to the point where the amount of tiny bubbles injected into the wastewater to satisfy the demand would not be enough to sufficiently mix the wastewater. When this happens the amount of tiny bubbles injected into the wastewater is typically kept high enough to sufficiently mix the wastewater. Thus, the diffusers consume more power than required to oxygenate the wastewater and can inject more dissolved oxygen into the aerobic zone than required.

Mixing the aerobic and anoxic zones with a mechanical mixer consumes a large amount of power relative to the amount of wastewater that it mixes, and often mixes some, but not all, of the wastewater in each zone. Thus, some of the sludge in the aerobic and anoxic zones remains on the bottom of the tank after it settles there. In the aerobic zone, the settled sludge can plug some of the diffusers. This can reduce the amount of dissolved oxygen injected into the wastewater, and thus requires one to clear the plugged diffusers.

BRIEF SUMMARY OF THE INVENTION

In one aspect of the invention, a tank for treating wastewater includes an aerobic zone in which bacteria and other microorganisms consume pollutants in the presence of dissolved oxygen. The tank may further include an anoxic zone in which bacteria and other microorganisms convert pollutants in the absence of dissolved oxygen to a more environmentally friendly form. The tank also includes a mixer located in the aerobic zone, the mixer generating mixing bubbles ranging in size from 6 to 30 inches across their largest dimension. The mixing bubbles are large enough to move wastewater and generate a mixing current as they rise to the surface. The mixing current mixes the wastewater, bacteria and other microorganisms, and the small oxygenating bubbles from the diffusers to promote the bacteria and other microorganisms' conversion of the pollutants contained in the wastewater.

Because the mixer requires less energy than a typical mechanical mixer, the mixer costs less to operate in order to provide satisfactory mixing of the wastewater, bacteria and other microorganisms and the oxygenating bubbles. The mixing bubbles are large enough that the amount of oxygen that they inject into the effluent as they move through it is negligible. Nonetheless, because of the increased retention of oxygenating bubbles caused by such mixing, oxygenation of the wastewater by the oxygenating small bubbles circulated by the mixer of the present invention is more efficient than in the previous art. Because the oxygenating bubbles are not used to achieve mixing of the wastewater, the amount of bubbles injected by the diffusers can be reduced to the minimal level required to meet the demand for dissolved oxygen, not only conserving energy, but also assuring that the wastewater is not over-oxygenated.

In the alternative, another advantageous aspect of the invention is that, at the outset of treatment, one can set the diffusers to the supply the minimum initial oxygen demand and not have to adjust aeration from the diffusers during aerobic treatment while the mixing bubbles move through the effluent.

BRIEF DESCRIPTION OF THE DRAWINGS

The foregoing objects, as well as further objects, advantages, features and characteristics of the present invention, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE PREFERRED EMBODIMENTS

Figure 1:
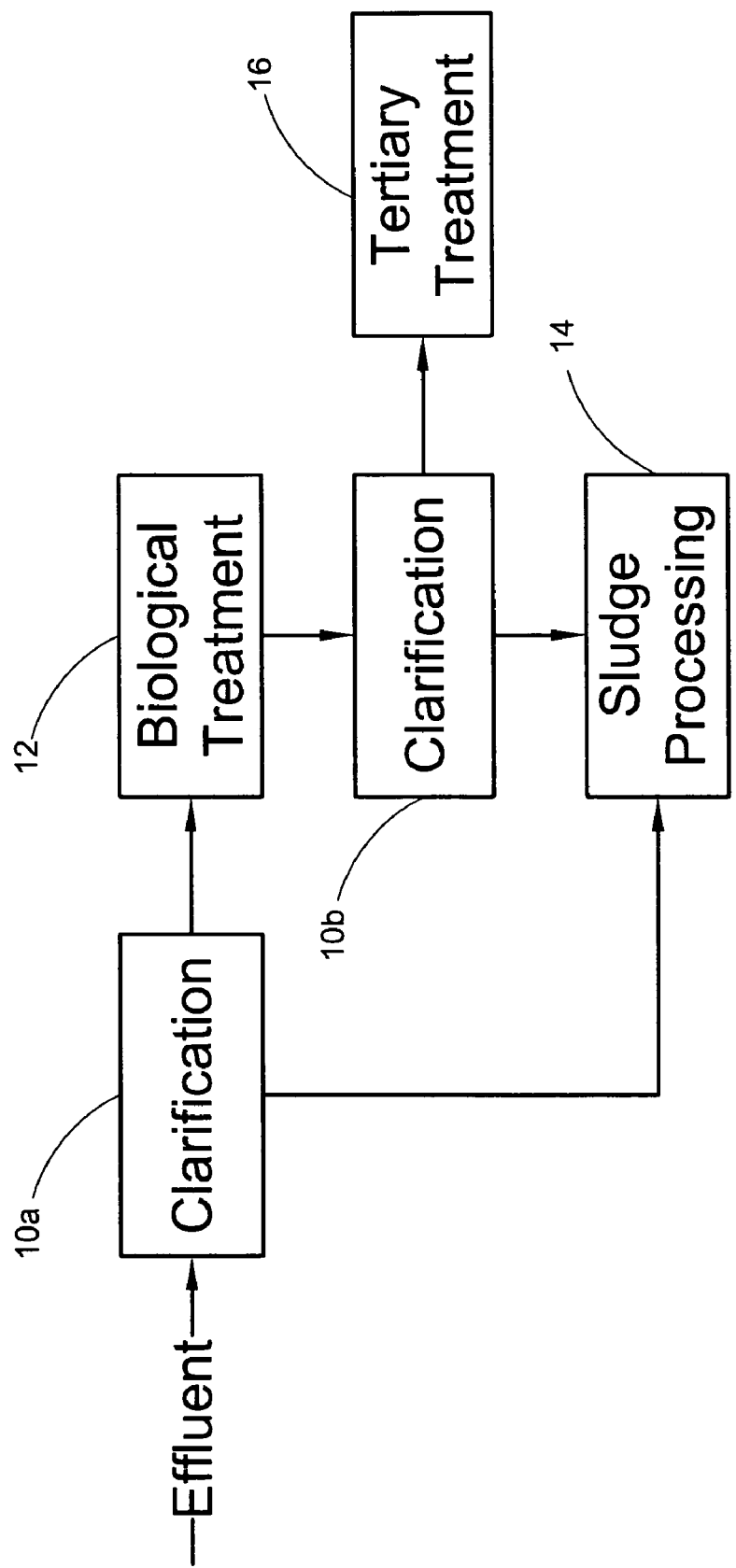
FIG. 1 is a schematic diagram of a typical wastewater treatment plant that includes a primary treatment process, a secondary treatment process, a tertiary treatment process, and a waste sludge treatment process.

FIG. 1 is a schematic diagram of a wastewater treatment process that includes a primary treatment process, a secondary treatment process and a tertiary treatment process. The primary treatment process includes a clarification stage 10a to separate dense portions of the wastewater, typically heavy solids, from less dense portions of the wastewater, typically light solids and liquid. The secondary treatment process includes a biological nutrient conversion stage 12 that converts the biological nutrient material contained in the light solids and liquid into a more environmentally friendly form. For example, in one embodiment, wastewater is first clarified into heavy solids, and light solids and liquid, in the clarification stage 10a using conventional techniques. The heavy solids are directed to a sludge processing stage 14 that processes the heavy solids using conventional techniques. The light solids and liquid are directed to the biological nutrient conversion stage 12 where they are subject to an aerobic, or an aerobic and an anoxic conversion process as discussed in greater detail in conjunction with FIGS. 2 and 3. During the biological nutrient conversion stage 12, the bacteria and other microorganisms convert the nutrient material contained in the wastewater to a form that is more environmentally friendly. From the biological nutrient conversion stage 12, the wastewater is directed to another clarification stage 10b that clarifies the liquid and any remaining heavy and light solids using conventional techniques. From the clarification stage 10b, the heavy sludge, which contains a predominance of bacteria, is partially directed to the sludge processing stage 14 that processes these heavy solids using conventional techniques and partially returned to the secondary treatment stage. The very light solids and liquid that does not contain excessive amounts of biologically nutrient material is directed to the tertiary treatment process 16 where remaining pollutant material is removed from the wastewater.

Figure 2:
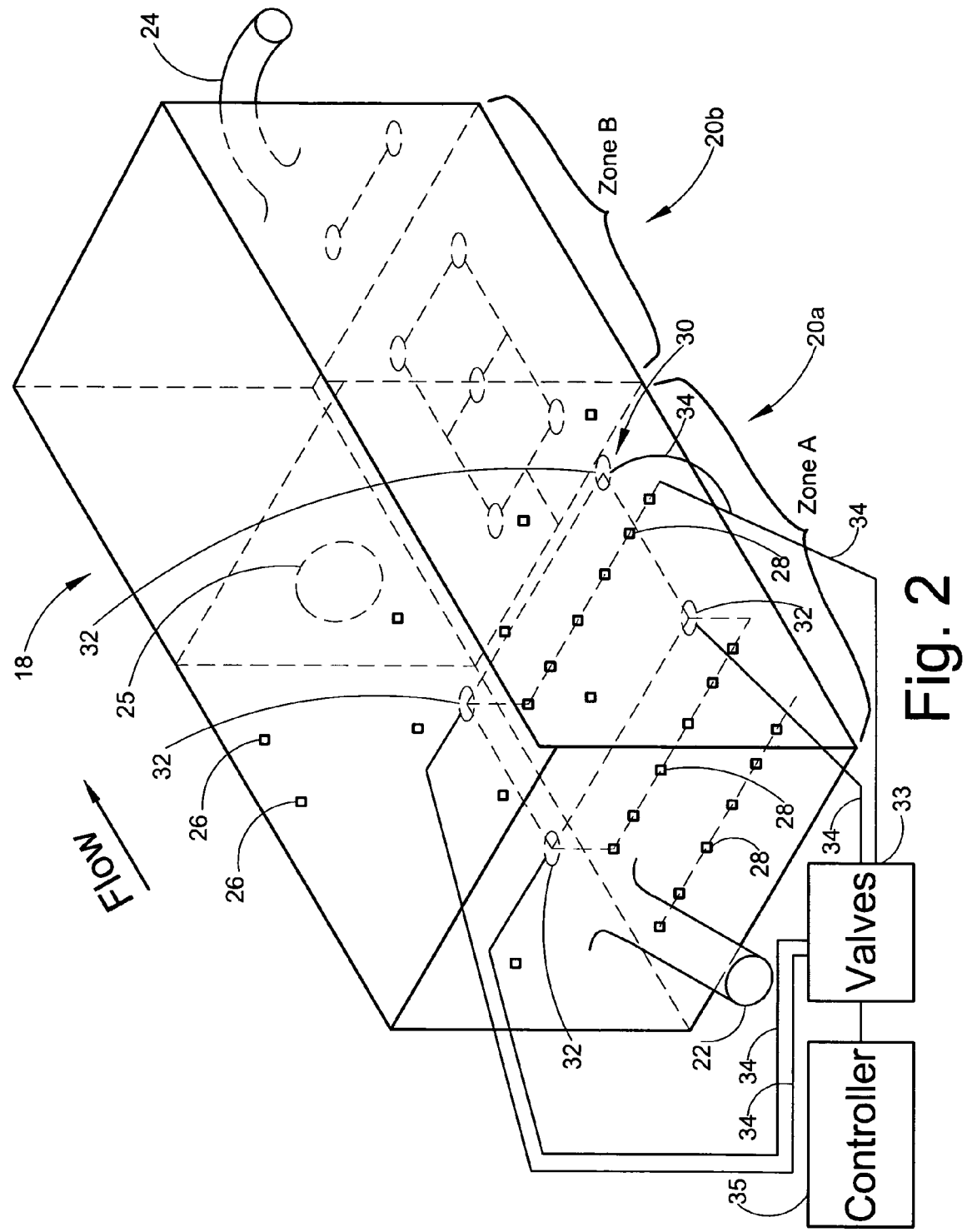
FIG. 2 is a perspective view of a tank that includes a zone in which an aerobic portion of a secondary treatment is performed and a mixer located in the zone, according to an embodiment of the invention.

FIG. 2 is a perspective view of a tank 18 in which a secondary treatment is performed, according to an embodiment of the invention. The tank 18 includes zones 20a and 20b in which bacteria and other microorganisms aerobically and anoxically consume and convert the pollutants contained in the wastewater. Although the tank 18 includes aerobic and anoxic zones 20a and 20b, the tank 18 may include one or more aerobic zones 20a, and not include an anoxic zone 20b. In one embodiment, for example, the tank 18 includes two zones 20a and 20b, an inlet 22 through which wastewater enters the tank 18, an outlet 24 through which wastewater exits the tank 18, and a portal 25 through which the wastewater leaves zone 20a and enters zone 20b. The zone 20a includes bacteria and other microorganisms that aerobically consume and convert pollutants in the wastewater, and the zone 20b includes bacteria and other microorganisms that anoxically consume and convert pollutants in the wastewater. Located in the zone 20a of the tank 18, a plurality of diffusers 28 (17 shown but only 3 labeled with the reference number 28 for clarity) supplied with pressurized, oxygen-containing gas to inject oxygen into the zone to promote the bacteria and other microorganisms' consumption and conversion of the pollutants.

As is well understood in the art, the diffusers 28 inject oxygen into the zone by the diffusion of small bubbles of oxygenated gas, such as air. These small bubbles are formed by supplying the oxygenated gas under pressure through the diffusers. As is also understood in the art, the volume of oxygenated gas supplied to the wastewater by these small bubbles is proportional to the volume of gas passed through the diffusers. As will be appreciated by those of skill in the art, however, because of the mixing provided by the large mixing bubbles according to the present invention, as described in greater detail below, it is possible to oxygenate the wastewater to a given level while supplying oxygenating gas through the diffusers at a much lower rate than in the prior art.

Figure 4:
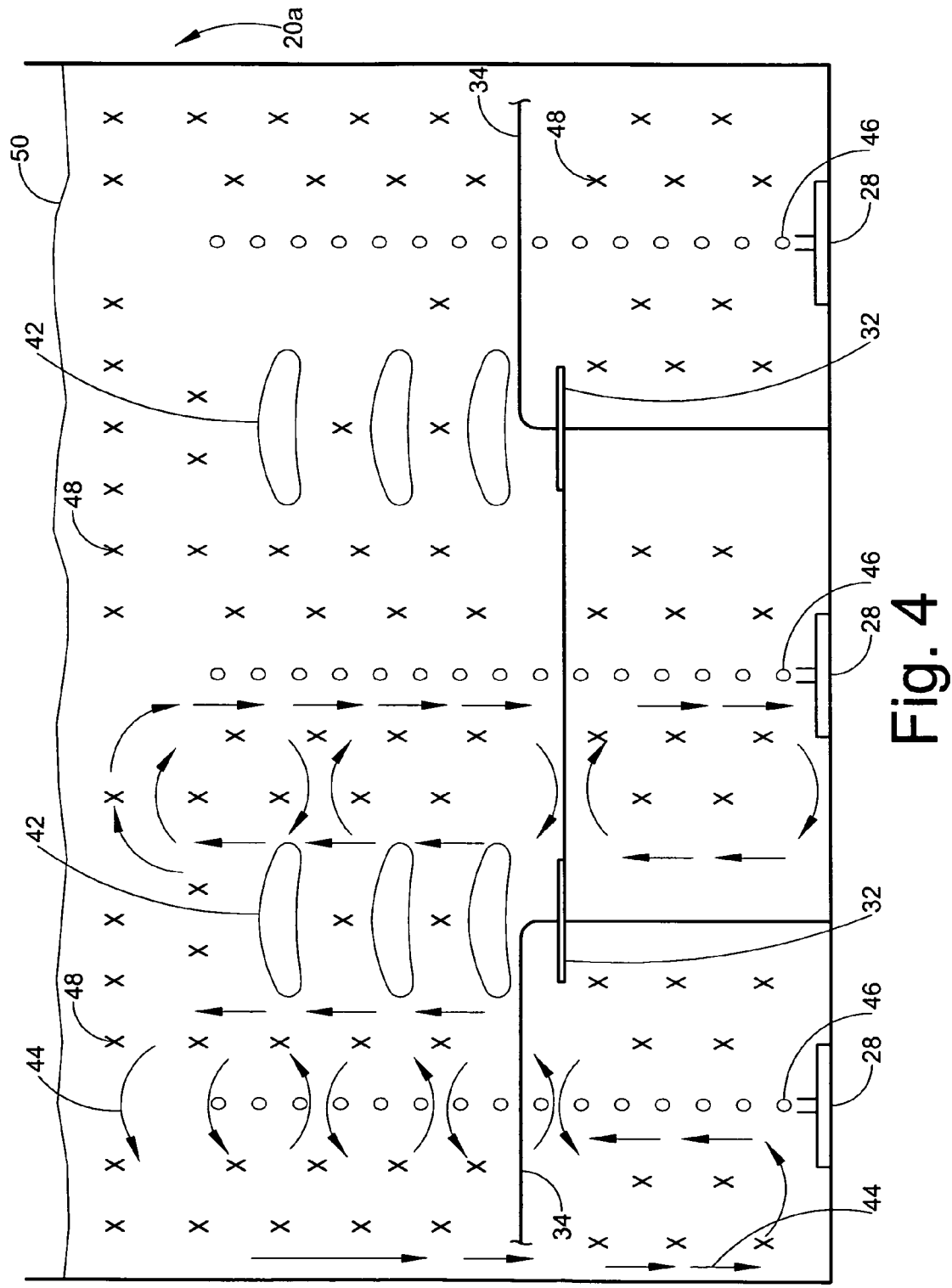
FIG. 4 is a view of the aerobic portion in FIG. 2.

Turning to the formation of large mixing bubbles, located in the zone 20a of the tank 18, a mixer 30 injects any fluid, such as air, that is less dense than the combination of the wastewater, and bacteria and other microorganisms to generate the large mixing bubbles (shown in FIG. 4). The mixing bubbles are large enough to move a substantial amount wastewater as they rise toward the wastewater's surface, and thus generate a mixing current (shown in FIG. 4) in the wastewater. While each diffuser 28 injects many small bubbles (shown in FIG. 4) rapidly to supply oxygen to the wastewater in the zone 20a, the mixing current generated by the large mixing bubbles mixes the bacteria and other microorganisms, and smaller oxygenating bubbles from the diffusers and wastewater, promoting oxygenation of the wastewater in the zone 20a.

The mixer 30 includes a forming plate 32 to form mixing bubbles from the injected fluid, and a valve 33 to permit or prevent the fluid from reaching the forming plate 32. The mixer 30 also includes a distribution line 34 to supply the forming plate 32 with the fluid when the corresponding valve 33 is open, and a controller 35 to open and close the valve 33. For example, in one embodiment, the mixer 30 includes four forming plates 32, four valves 33, and four distribution lines 34, and the controller 35 includes a memory (not shown) and a processor (not shown) to allow one to input data to control when and how long each valve 33 is open, and the pressure of the air supplied to the valves 33. In some embodiments, valves 33 and controller 35 are located in the same enclosure.

Figure 3:
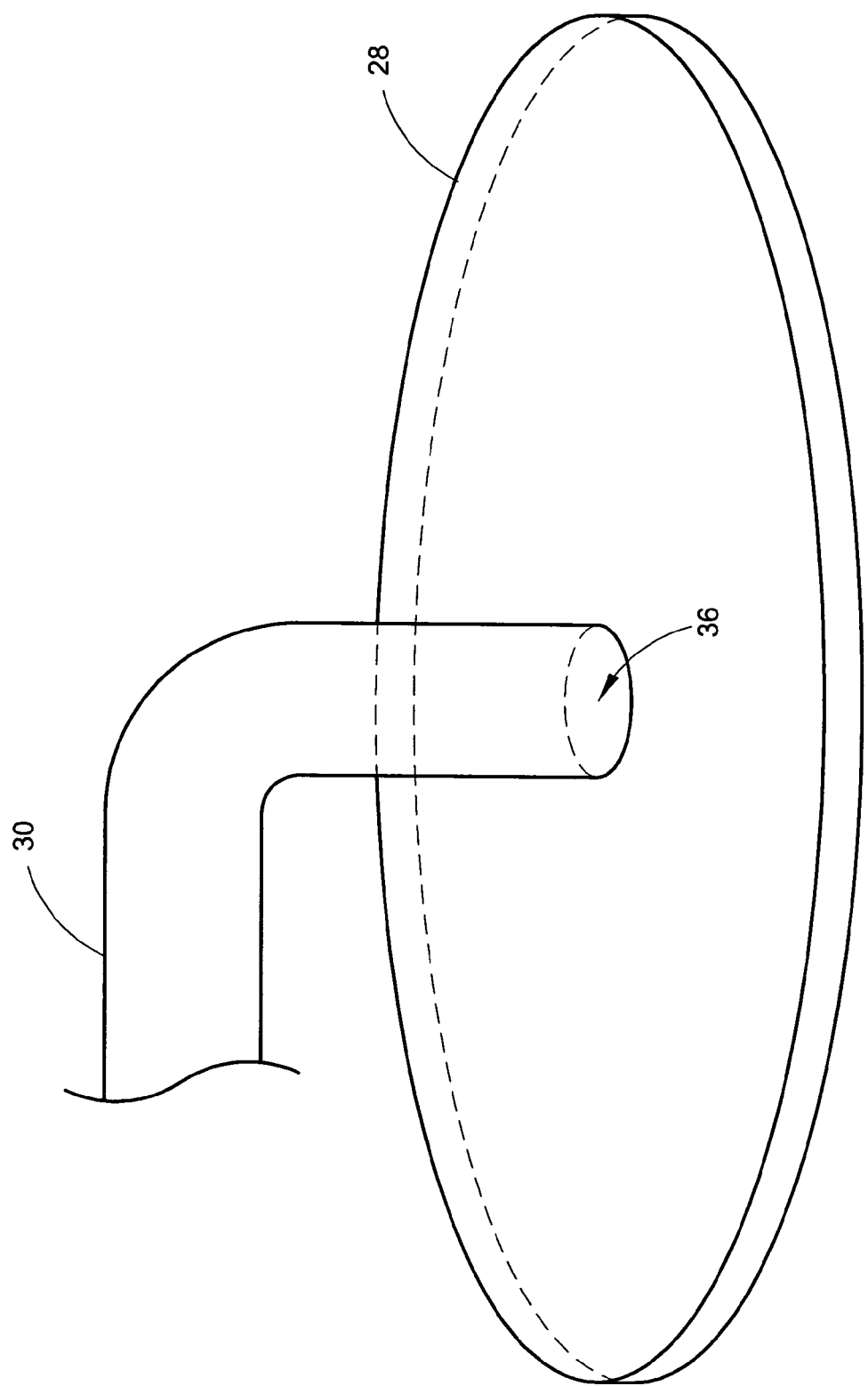
FIG. 3 is a perspective view of a forming plate of the mixer in FIG. 2.

Each forming plate 32, one embodiment of which is shown in FIG. 3, includes an orifice 36. When the valve 33 is opened, air flows through the distribution line 34 toward the forming plate 32, and then exits the distribution line 34 through the orifice 36. The forming plate 32 prevents the air from rising toward the surface of the wastewater until the valve 33 injects more air than the forming plate 32 can hold, at which time most of the air escapes from under the forming plate 32 and forms a large mixing bubble. The large mixing bubble then rises toward the surface of the wastewater. When the valve 33 is closed, air does not flow through the orifice 36. For additional discussion on the forming plate 32 and an embodiment of an injector see U.S. Pat. No. 6,629,773, titled IMPROVED METHOD AND APPARATUS FOR GAS INDUCED MIXING AND BLENDING OF FLUIDS AND OTHER MATERIALS, issued to Parks on 7 Oct. 2003, which is herein incorporated in its entirety. For additional discussion on the controller 35 see PCT Patent Application PCT/US2004/011248, titled APPARATUS AND METHOD FOR GAS INDUCED MIXING AND AGITATING OF A FERMENTING JUICE IN A TANK DURING VINIFICATION, filed 8 Apr. 2004, which is also herein incorporated in its entirety.

Still referring to FIG. 2, the forming plates 32 may be arranged throughout the aerobic zone 20a as desired to provide any desired mixing current arrangement. In one embodiment, the forming plates 32 are spatially located a few inches above the bottom of the tank 18 in the zone 20a. The forming plates 32 each may be located closer to the bottom of the tank 18 in zone 20a or further away from the bottom of the tank 18. Preferred embodiments employ one or more forming plates 32 located on the bottom of tank 18 or at most a few inches above the bottom, in order to maximize the efficacy of the mixing afforded by the large bubbles.

Figure 5:
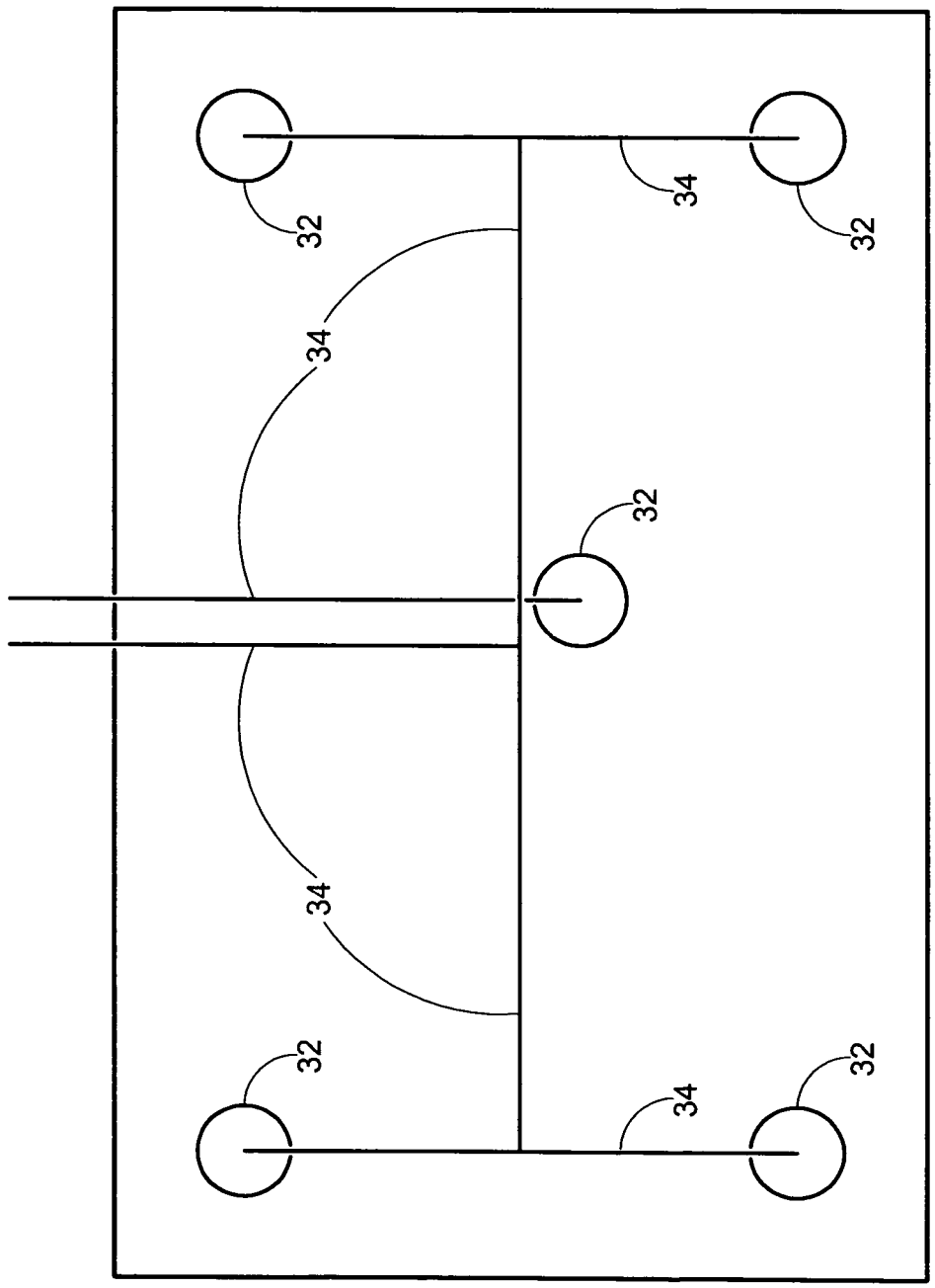
FIG. 5 is a view of forming plates located and arranged in a tank, according to another embodiment of the invention.
Figure 6:
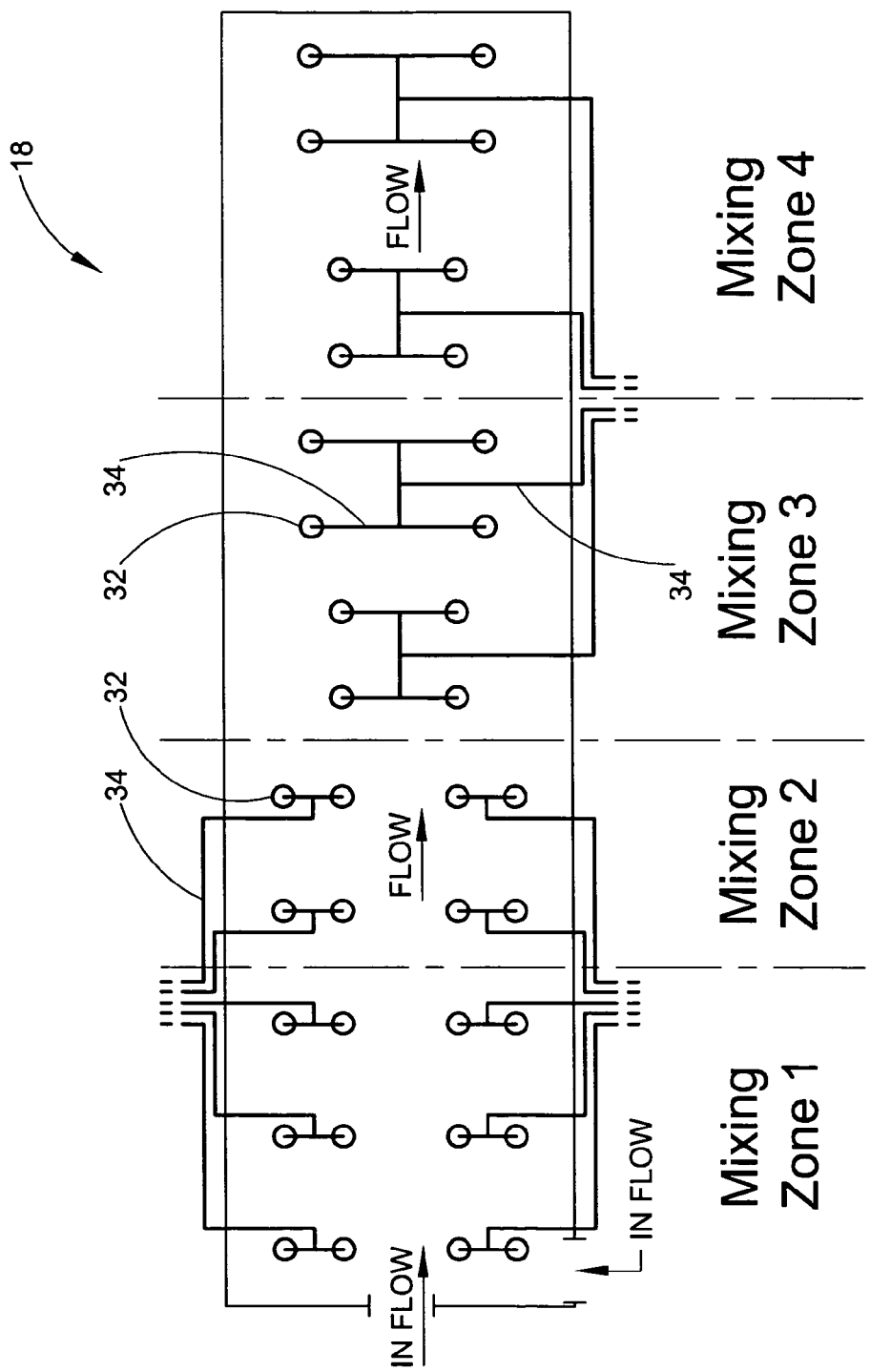
FIG. 6 is a view of forming plates located and arranged in a tank, according to yet another embodiment of the invention.

In the depicted embodiment, the forming plates 32 are spatially arranged in the zone 20a to form a rectangle. Numerous other spatial arrangements of the plates 32 are possible, such as that shown in the zone 20b. In still other embodiments, the forming plates 32 may be arranged as shown in FIGS. 5 and 6. FIG. 5 shows a preferred embodiment, in which supply lines 34 are provided for five plates 32 in arrangement providing one of four plates 32 on each of the corners of a square and one plate 32 in the center of the square. FIG. 6 shows an alternative embodiment.

The region of the tank occupied by the forming plates 32 may vary, depending upon tank configuration and wastewater treatment requirements, from less than 25 square feet to more than 100 square feet.

Returning to FIG. 2 the valves 33 may also be opened and closed in any desired sequence to provide any desired mixing current. For example, in one embodiment, the two valves 33 that correspond to the forming plates 32 that are closest to the inlet 22 may first permit air to flow toward the forming plates 32. Then, after these valves 33 have closed, the remaining two valves 33 corresponding to the remaining forming plates 32 may permit air to flow toward the forming plates 32.

Continuing to refer to FIG. 2, each bubble formed by a forming plate 32 may be formed at any desired period of time relative to the previous bubble formed by the forming plate 32. For example, in one embodiment a forming plate 32 may form a mixing bubble as the previously formed mixing bubble reaches the surface of the wastewater.

FIG. 4 is a view of the aerobic portion in FIG. 2. The mixing bubbles 42 (6 shown but only 2 labeled with the reference number 42 for clarity) generate the mixing currents indicated by the arrows 44 (37 arrows shown but only 3 labeled with the reference number 44 for clarity) that mix the small, oxygenating bubbles 46 (41 but only 3 labeled with the reference number 42 for clarity), media particles 48 (many shown but only 3 labeled with the reference number 48 for clarity) and the wastewater 50. The strength of the mixing currents depends on the speed at which each mixing bubble travels through the effluent and their size.

The speed of the mixing bubble depends on the density of the fluid relative to the density of the wastewater and the bubble's shape. The greater the difference between the densities of the wastewater and the fluid, the faster the mixing bubbles rise through the wastewater. The more aerodynamic the shape of the bubble becomes the faster the bubble rises through the wastewater. For example, in one embodiment, the shape of the bubble is similar to the shape of a disc. The leading surface (relative to the direction of travel) of the disc is concave when viewed from the surface of the effluent, and the trailing surface is less concave than the leading surface when viewed from the surface of the wastewater.

The size of the mixing bubble 42 depends on the flow rate of the fluid into the wastewater 50. The flow rate depends on the size of the orifice 36 and the fluid's injection pressure. As one increases the fluid-injection pressure, one increases the amount of fluid injected into the wastewater 50 over a specific period of time that the valve 33 is open. And, as one increases the area of the orifice 36, one increases the amount of fluid injected into the wastewater 50 over a specific period of time that the valve 33 is open. As one increases the diameter of the forming plate 32 one increases the amount of fluid the forming plate 32 can hold before the fluid escapes it. For example, in one embodiment the size of the bubble 42 is approximately 6 inches across its largest dimension. In other embodiments, the bubble 42 is approximately 10 feet across in largest dimension.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

We claim:

1. A system for treatment of wastewater, the system comprising
    a tank containing an aerobic wastewater treatment zone, the zone having an upper portion and a lower portion;
    a plurality of diffusers supplied with a volume of pressurized gas containing oxygen for supplying oxygen in the form of small bubbles for oxygenating the wastewater within the zone; and
    a means supplied with an adjustable volumetric flow rate of pressurized gas for generating large mixing bubbles of 6 inches or greater in diameter within the lower portion of the wastewater treatment zone.

2. A system according to claim 1, wherein the large mixing bubbles are generated substantially at the bottom of the tank.

3. A system according to claim 1, wherein the volumetric flow rate by of pressurized gas supplied to the diffusers is adjustable to oxygenate the wastewater to a given level.

4. A system according to claim 3, wherein the wastewater has a biological oxygen demand and the volume of pressurized gas supplied to the means for generating large mixing bubbles and the volume of pressurized gas supplied by the diffusers to the contents of the tank are each adjusted to minimize total volume of pressurized gas while maintaining an amount of dissolved oxygen in the wastewater equal to the biological oxygen demand of the wastewater.

* * * * *